United States Patent Office 3,606,364
Patented Sept. 20, 1971

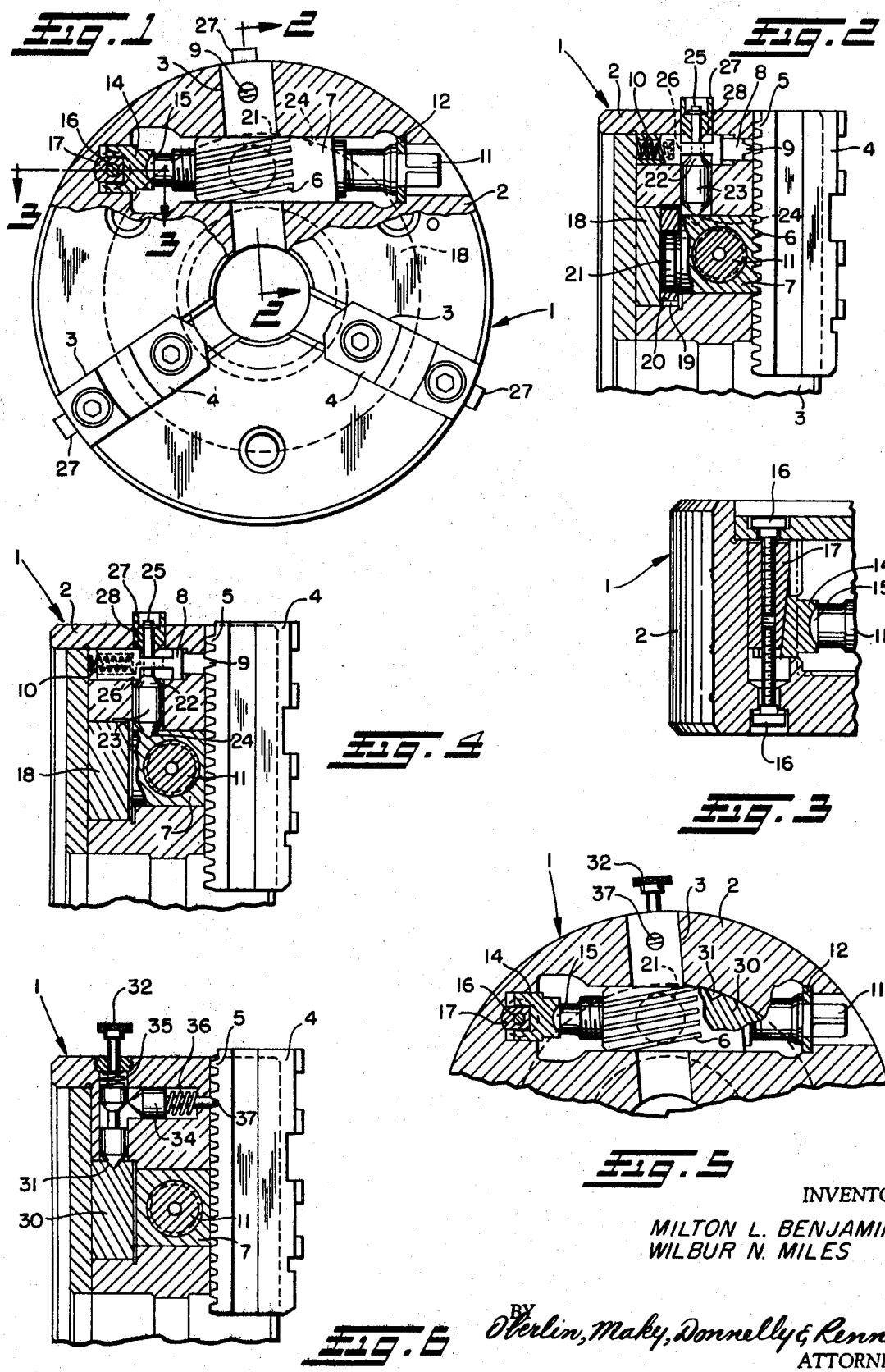

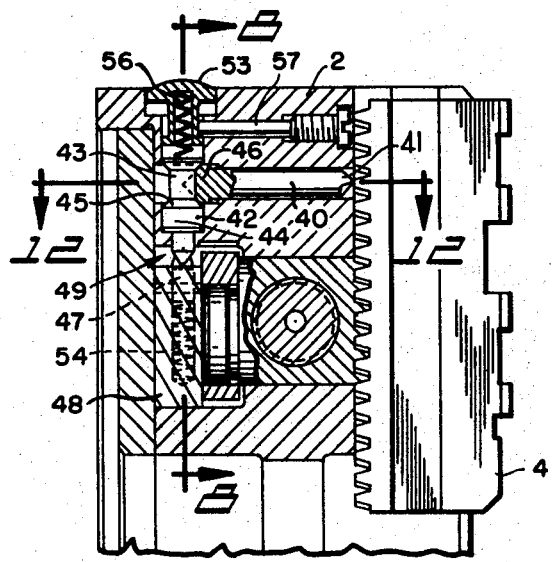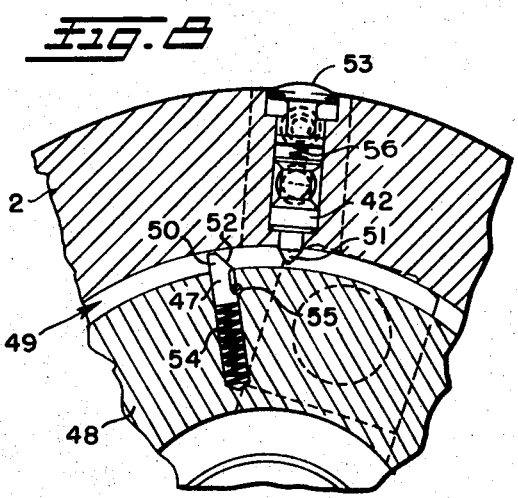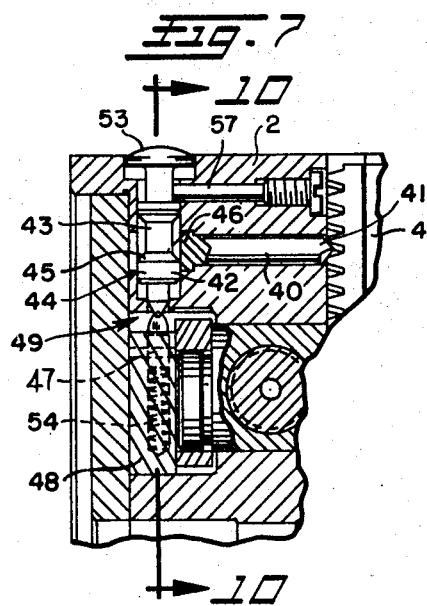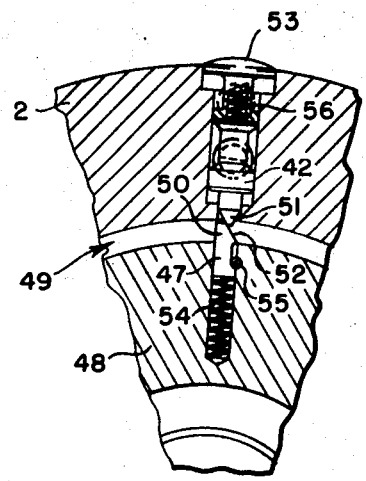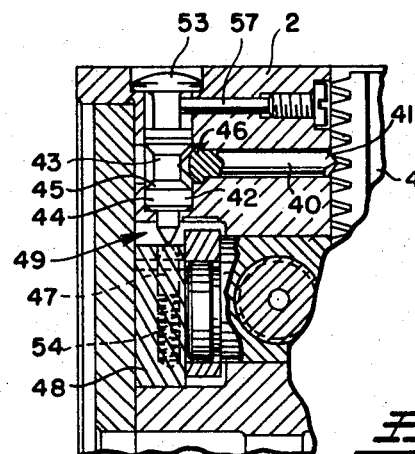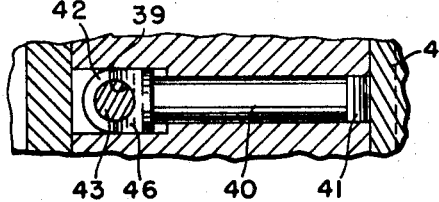

3,606,364
JAW CHUCK IMPROVEMENTS
Milton L. Benjamin and Wilbur N. Miles, Chagrin Falls, Ohio, assignors to Erickson Tool Company, Solon, Ohio
Continuation-in-part of application Ser. No. 781,460, Dec. 5, 1968. This application Aug. 13, 1969, Ser. No. 863,736
Int. Cl. B23b 31/16
U.S. Cl. 279—121    9 Claims

ABSTRACT OF THE DISCLOSURE

Jaw chuck embodying automatic lock means which must be manually released from the jaws before the latter may be radially adjusted or removed from the chuck body for turning end for end or for replacement.

BACKGROUND OF THE INVENTION

This application is a continuation-in-part application of prior application Ser. No. 781,460, filed Dec. 5, 1968, and now abandoned and assigned to the assignee of the instant application.

Heretofore, it has been known to provide visual signal means on a jaw chuck to denote that the jaw actuator teeth are disengaged from the jaw teeth for radial positioning or for removal of the jaws. If the machine operator overlooks such visual signal, the rotation of the chuck will cause the jaws to be thrown out by centrifugal force with consequent damage to the machine and possible personal injury of the operator or others who may be struck by the flying jaws.

SUMMARY OF THE INVENTION

A principal object of the present invention is to provide a jaw chuck having automatic lock means which must be manually released from the jaws before the jaws can be radially adjusted or removed from the chuck body for turning end for end or for replacement.

More specifically, it is another object of this invention to provide a jaw chuck having automatic lock means which is spring-biased to jaw retaining position thus requiring manual actuation against the spring bias before the jaws are released for such adjustment or for removal from the chuck body.

It is another object of this invention to provide a jaw chuck having a spring-actuated lock means as aforesaid, which additionally requires manual operation for insertion of the jaws in the chuck body.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

BRIEF DESCRIPTION OF THE DRAWING

FIG. 1 is a front elevation view partly broken away illustrating a jaw chuck embodying the present improvements;

FIGS. 2 and 3 are cross-section views taken substantially along the lines 2—2 and 3—3, FIG. 1;

FIG. 4 is a fragmentary cross-section view similar to FIG. 2 except illustrating the locking pin in a position locking the associated jaw against radial movement when the jaw actuator teeth have been disengaged from the jaw teeth;

FIGS. 5 and 6 are fragmentary cross-section views generally similar to FIGS. 1 and 4 respectively, except illustrating another form of locking means.

FIG. 7 is a fragmentary cross-section view similar to FIG. 2 except illustrating a still further form of locking means in accordance with the present invention;

FIG. 8 is a cross-section view taken substantially along line 8—8 of FIG. 7;

FIG. 9 is a fragmentary cross-section view of the embodiment of FIG. 7 illustrating the locking pin in a position locking the associated jaw against radial movement when the jaw actuator teeth have been disengaged from the jaw teeth;

FIG. 10 is a section view taken along line 10—10 of FIG. 9;

FIG. 11 is a fragmentary cross-section view similar to FIGS. 7 and 9 illustrating the component parts of the locking means in still different relative positions; and FIG. 12 is a section view taken along the line 12—12 of FIG. 7.

DISCUSSION OF THE INVENTION

Referring first to the embodiment of the invention illustrated in FIGS. 1 to 4, the chuck 1 shown for purposes of illustration comprises a chuck body 2 having radial slots 3 in which jaws 4 are guided for radial inward and outward movement. Each jaw 4 is formed with diagonally extending teeth 5 for meshing with inclined teeth 6 on an associated wedge block 7 which is guided in the chuck body 2 to move generally transverse to the radial slot 3. When the teeth 5 and 6 are disengaged by movement of said wedge block 7 toward the left (as viewed in FIG. 1), the jaw 4 may be radially positioned as desired, or radially removed for reversal or replacement only by first withdrawing the locking pin 8 to disengage the tooth 9 thereof from a tooth space of the jaw 4. The locking pin 8 is biased by the spring 10 to locking position as hereinafter explained in detail.

The wedge blocks 7 are preferably of identical construction except that only the one shown has an operating screw 11 in threaded engagement therewith, the screw 11 being axially fixed in the chuck body 2 between a thrust ring 12 and a spherical socketed wedge member 14 in which the spherical end 15 of the screw is engaged. As evident from FIG. 3, the loosening of one screw 16 and tightening of the other screw 16 will move the wedge 17 in one direction or the other thus to eliminate axial play of the operating screw 11 and also to axially preload the screw 11 between the socket of the wedge member 14 and the thrust ring 12.

The movement of said one wedge block 7 responsive to turning of the operating screw 11, is transmitted to the other two wedge blocks 7 (not shown) as by means of a transmission ring 18 which is rotatably supported in the chuck body 2 and which has three radial slots 19 engaged by drive rings 20 that are pivotally mounted on the bosses 21 of the respective wedge blocks 7.

When it is desired to change the gripping diameter of the jaws 4 or when it is desired to remove the jaws 4 for reversal or replacement, the operating screw 11 will be turned in a direction such that the wedge block 7 will be moved leftward as viewed in FIG. 1 until the teeth 6 are disengaged from the teeth 5 of the jaw 4. When that occurs, the spring 10 will through the camming engagement of the locking pin 8 with the cam face 22 of the plunger 23 move the latter radially inward until its pointed end is seated (as shown in FIG. 4) in a conical depression 24 in the top side of the wedge block 7. In this way, the locking pins 8 are permitted to be moved toward the respective jaws 4 so that the teeth 9 are engaged in the tooth spaces of the jaws 4 to prevent radial movement or removal thereof. The shank 25 of the plunger 23 extends through an elongated slot 26 in the locking pin 8 to permit lengthwise movement thereof but to prevent rotation thereof so that the tooth 9 thereof will be held in alignment with the jaw teeth 5.

When it is desired to radially adjust any jaw 4 the respective unlocking member 27 reciprocable on the shank 25 is pushed in radially whereby the cam surface 28 thereof will engage the respective locking pin 8 to urge it toward the left as viewed in FIG. 4, thus to disengage the tooth 9 from the jaw teeth 5 so that the associated jaw 4 may then be moved radially inward or outward or may be removed from the chuck 1 for reversal or replacement. When a jaw 4 has been radially adjusted or inserted with the locking pin 8 in retracted position as aforesaid, the operator merely releases finger pressure on the member 27, whereupon the locking pin 8 is biased by spring 10 toward the right with its tooth 9 engaged in a tooth space of the jaw 4.

In the modified form of the invention illustrated in FIGS. 5 and 6, the transmission ring 30 is provided with conical depressions 31 around its periphery into which spring actuated plungers 32 are urged when the operating screw 11 is turned to disengage the teeth 6 of the wedge blocks 7 from the teeth 5 of the respective jaws 4. Such inward movement of each plunger 32 cams the associated locking pin 34 into a tooth space of the associated jaw 4 whereby the latter is locked in place against radial movement. If it be desired to radially adjust any jaw 4, the respective plunger 32 is pulled outwardly against its biasing spring 35 whereby the spring 36 moves locking pin 34 in a direction to disengage its tooth 37 from the tooth space of the jaw 4, whereupon the latter may be radially adjusted or withdrawn for reversal or replacement.

It is to be noted that in both forms of the invention, when a particular jaw 4 has been removed and manual pressure has been released from the operating member 27 or 32, the locking pin 8 or 34 will be urged to a position preventing reinsertion of the jaw 4 except by first pushing the operating member 27 or pulling the operating member 32 as above described.

Of course, in FIGS. 5 and 6, the spring 35 will be of sufficient strength so that when the plunger or operating member 32 is released, it will overcome the bias of spring 36 on the locking pin 34.

In both forms of the invention the normal operation of the chuck 1 would involve the rotation of the operating screw 11 in opposite directions to effect workpiece gripping and releasing movements of the jaws 4. In this normal operation the plungers 23 in FIGS. 1 to 4 and the plungers 32 in FIGS. 5 and 6 are held radially outward by the wedge blocks 7 or by the transmission ring 30 thus to hold the locking pins 8 or 32 in their retracted positions so that the jaws 4 are free to move in response to longitudinal movement of the wedge blocks 7 to grip or release a workpiece.

It is only when the jaws 4 are to be radially adjusted or removed for turning end for end or for replacement that the wedge blocks 7 (or the transmission ring 30) are moved to a position aligning the depressions 24 or 31 with the respective plungers 23 and 32 so that the jaws 4 are released from the wedge blocks 7 but are locked against flying out from the chuck 1.

Although the embodiments of FIGS. 1-4 and 5-6 perform satisfactorily, it is possible for the radially oriented plungers 23 (in FIGS. 1-4) and 32 (in FIGS. 5-6) to move outwardly under centrifugal force if the chucks are rapidly rotated, resulting in disengagement of the respective locking pins from the jaws. In the embodiment of FIGS. 1-4, radial outward movement of plunger 23 (FIG. 4) causes cam surface 22 to force the locking pin 8 to the left against the biasing force of spring 10. Accordingly, the tooth 9 of the pin becomes disengaged from the tooth spaces of jaw 4. In the embodiment of FIGS. 5-6, radial outward movement of plunger 32 (FIG. 6) against the biasing force of spring 35 frees locking pin 34 for movement to the left and disengagement with the jaw 4. In both cases, the radial outward movement of the plungers is against the biasing force of a spring, but it is possible that the rate of rotation would be sufficient to provide that centrifugal force necessary to overcome the bias.

The above, of course, would occur only if an operator accidentally started the machine after disengaging the wedge blocks 7 from the jaws 4, preparatory to turning the jaws end-to-end, radial adjustment of the jaws, or removal and replacement of the jaws.

The embodiment of FIGS. 7-12 prevents the above from occurring.

As with the previous embodiments, a locking pin 40 (FIG. 7) has a wedge shaped end 41 which engages the tooth spaces of jaw 4. A plunger 42 is reciprocably movable in body 2 of the chuck in radial directions generally at right angles with the orientation of the plunger. The purpose of the plunger is to cam lock the locking pin 40, similar to the previous embodiments, but as distinguished from the previous embodiments, the plunger locking position is its outermost radial position in the chuck body. This is accomplished by providing the plunger 42 with a reduced diameter portion 43, which is cylindrical in shape, and radially inward of the reduced diameter portion, but spaced therefrom, a cylindrical surface 44 of greater diameter. Intermediate the two cylindrical surfaces, the plunger is provided with a frustoconical cam surface 45.

The end 46 of the locking pin 40 remote from the toothed end 41 is tapered in shape (as a chisel), but has a cylindrical recess 39 (FIG. 12) formed in the end which is adapted to seat against the cylindrical surfaces of either the reduced diameter portion 43 or the larger diameter surface 44.

FIG. 7 shows the plunger 42 in its innermost position with the reduced diameter portion 43 centered in alignment with the plunger. In this position, the locking pin 40 is able to move to the left out of engagement with the jaw 4. FIG. 9 shows the plunger moved radially outward from the position of FIG. 7 into its outermost position, and in movement to this position, the locking pin 40 is forced to the right by the cam surface 45 into engagement with the jaw 4. The movement of the locking pin to the right is sufficient for the larger diameter surface 44 to engage the locking pin wedging or camming the latter against the jaw.

It is apparent that centrifugal force imposed upon the plunger, through inadvertent starting of the machine, has the only effect of causing the plunger to wedge or cam the locking pin more securely against the jaw preventing the jaw from flying from the machine.

The purpose of the cylindrical mating surfaces of the plunger and locking pin is to prevent the latter from turning on its axis, that is, to maintain the proper orientation of the end 41 with respect to the jaw 4. This is shown in FIG. 12.

A spring loaded cam pin 47 is provided to move the plunger 42 to its outermost locking position. As shown in FIGS. 8 and 10, the cam pin is contained in the outer periphery of the transmission ring 48. In FIG. 8, the transmission ring is in the position it occupies when the wedge block 7 is in full engagement with the jaw 4, that is, the position of FIG. 1. FIG. 9, FIG. 10 illustrate the position of the transmission ring when the operating screw 11 of FIG. 1 is rotated to move the wedge block 7 to the left out of engagement with the jaw 4. In this example, the transmission ring rotates in a clockwise direction.

The transmission ring 48 and chuck body 2 together define an annular slot 49 into which a portion 50 of the cam pin 47 extends, and also into which a conical tip 51 of plunger 42 extends. The cam pin is provided with a sloped wedge surface 52. On rotation of the transmission ring clockwise to the position where the jaw is disengaged from the wedge block 7 (FIG. 9, FIG. 10), the cam pin 47 contacts the conical end of plunger 42, forcing the latter radially to its outer camming position with locking pin 40. In this way, the chuck jaws are securely locked against removal even though disengaged from the respective wedge blocks 7. As mentioned, if the chuck is inadvertently rotated, centrifugal force on the plunger 42 only further secures each locking pin against the jaw 4 with which it is associated.

The locking pin 40 can be disengaged from the jaw 4 by pressing down or in on manual operator 53, FIG. 11. This forces the plunger 42 inward aligning the reduced diameter portion of the plunger with the locking pin. Subsequent manual pressure on the jaw 4, for instance for the purpose of removal, causes the jaw teeth to force the locking pin to the left out of engagement with the jaw. The latter can then be removed or reset.

The cam pin 47 is biased against the plunger by a compression spring 54, so that when the operator 53 is depressed, give in the compression spring permits the axial or inward movement of the plunger, to its non-camming position.

A pin stop 55 seated in the transmission ring retains the cam pin 47 in the periphery of the ring, but permits the cam pin to be depressed into the ring with inward movement of the plunger.

Manual operator 53 provides a seat for a coil spring 56, FIG. 7. This spring also seats against the plunger 42. A setscrew 57 is provided to retain the operator 53 in the chuck body 2, so that by means of the spring 56, the plunger is biased to a normal, innermost, non-camming position in which the locking pin 40 is free to move into and out of engagement with jaw 4. The spring force of the cam pin spring 54 is sufficiently greater than that of operator spring 56, so that rotation of the transmission ring to the position of FIG. 10 causes the plunger to cam the locking pin against the jaw 4, rather than causing the cam pin spring to compress.

It is apparent that the embodiment of FIGS. 7–12 provides an improved operable arrangement in which the plunger for the locking pin has a normal innermost radial position, and an outermost locking or camming position. one in which centrifugal force on the chuck body has no adverse affect.

We, therefore, particularly point out and distinctly claim as our invention:

1. A chuck comprising a body; a plurality of jaws on said body, at least one of which is radially movable to grip and release a workpiece within or around said jaws; actuator means movable in said body generally transversely to said one movable jaw and having inclined teeth intermeshing with teeth on said one jaw to move the latter radially inward and outward responsive to movement of said actuator means in opposite directions; manually releasable lock means engageable with said one jaw upon disengagement of said teeth thus to retain said one jaw in said body in the event of inadvertent rotation of said chuck while said teeth are disengaged; said lock means comprising a locking pin movable into and out of engagement with a tooth space in said one jaw; and operating means movable outwardly in said body relative the axis of rotation of the body into camming engagement with said locking pin to hold the latter in locking engagement with said one jaw.

2. The chuck of claim 1 including a manual operator to move said operating means inward, said operating means being movable radially in said body.

3. The chuck of claim 1 including spring means biasing said operating means normally inwardly out of camming whereby the latter is locked in place against radial movement of the operating means into camming engagement with the locking pin.

4. The chuck of claim 1 wherein said locking pin comprises a chisel-shaped end engaging said operating means, the latter having a frustoconical cam surface against which one of the sloping surfaces of said locking pin end bears in movement of the operating means into camming engagement with the locking pin.

5. The chuck of claim 4 wherein said operating means comprises a first cylindrical surface of reduced diameter; a second cylindrical surface of greater diameter than said first cylindrical surface and spaced inwardly therefrom; said cam surface being between said cylindrical surfaces; the locking pin having a longitudinal axis; the chisel end thereof comprising a concave surface intersecting the sloping surfaces adapted to cooperate with said operating means cylindrical surfaces whereby the locking pin is prevented from turning on its longitudinal axis.

6. The chuck of claim 1 including cam means to actuate said operating means automatically outwardly into camming engagement with said locking means when the teeth of the actuator means and jaw are disengaged; means to actuate said operating means inwardly out of camming engagement with said locking means; and means yieldingly supporting said cam means for inward movement of said operating means.

7. A chuck comprising a body having a plurality of radially extending slots; jaws radially movably guided in said slots to grip and release a workpiece therebetween or thereabout; each jaw having parallel teeth extending angularly with respect to a line perpendicular to the line of radial movement of said jaw; actuators movable in said body generally transversely to the respective jaws and having parallel teeth intermeshing with the teeth of the respective jaws to move the latter radially inward and outward responsive to movement of said actuators in opposite directions; a transmission ring rotatable in said body; driving members on the respective actuators having driving connections with said ring whereby movement of one actuator transmits the same motion to the other actuators through said ring and driving members; an operating screw rotatable in said body and having screw threaded engagement with said one actuator thus to move said one actuator; and manually releasable lock means engageable with the respective jaws upon disengagement of the teeth of said actuators and jaws whereby radial positioning or removal of said jaws may be effected only by releasing the respective lock means; each locking means comprising a locking pin movable generally parallel to the chuck axis into engagement with a tooth space of the respective jaw; a generally radially movable operating means which is adapted to be moved radially outward into camming engagement with said pin to move the latter into engagement with said tooth space; and an operator to move said operating means radially inward to free said locking pin for movement out of engagement with a tooth space of the respective jaw.

8. The chuck of claim 7 including spring means biasing said operating means normally radially inwardly in the chuck body.

9. The chuck of claim 8 including cam means contained in the periphery of said transmission ring, the cam means on rotation of the transmission ring and movement of the actuators out of engagement with the respective jaws being adapted to engage said operating means to move the latter radially outwardly into camming engagement with the locking pin; and second spring means yieldingly supporting said cam means to permit radially inward movement of said operating means.

References Cited

UNITED STATES PATENTS

| 1,594,716 | 6/1924 | Forkardt | 279—114 |
| 2,602,673 | 12/1948 | Deuring et al. | 279—121X |

ANDREW R. JUHASZ, Primary Examiner

J. F. COAN, Assistant Examiner

U.S. Cl. X.R.

279—1(ME), 110